(12) United States Patent
Dange et al.

(10) Patent No.: US 12,603,780 B2
(45) Date of Patent: \*Apr. 14, 2026

(54) SYSTEM AND METHOD FOR MANAGING AN OPERATING SYSTEM USING TOKENIZED IDENTITY

(71) Applicant: Amod Ashok Dange, Mountain View, CA (US)

(72) Inventors: Amod Ashok Dange, Mountain View, CA (US); Yash Mody, Mumbai (IN)

(73) Assignee: Amod Ashok Dange, Mountain View, CA (US)

( \* ) Notice: Subject to any disclaimer, the term of this patent is extended or adjusted under 35 U.S.C. 154(b) by 27 days.

This patent is subject to a terminal disclaimer.

(21) Appl. No.: 18/782,801

(22) Filed: Jul. 24, 2024

(65) Prior Publication Data

US 2024/0380598 A1     Nov. 14, 2024

Related U.S. Application Data

(63) Continuation-in-part of application No. 17/481,468, filed on Sep. 22, 2021, now Pat. No. 12,072,963, (Continued)

(51) Int. Cl.
*H04L 9/32* (2006.01)
*H04L 9/08* (2006.01)
(Continued)

(52) U.S. Cl.
CPC .......... *H04L 9/3213* (2013.01); *H04L 9/0866* (2013.01); *H04L 9/0869* (2013.01);
(Continued)

(58) Field of Classification Search
CPC ... H04L 9/3213; H04L 9/0866; H04L 9/0869; H04L 9/30; H04L 9/3231; H04L 9/3247;
(Continued)

(56) References Cited

U.S. PATENT DOCUMENTS 6,401,206 B1   6/2002   Khan et al.
7,013,290 B2   3/2006   Ananian
(Continued)

FOREIGN PATENT DOCUMENTS

JP        4675660 B2   10/2006
JP      2014127164 A   7/2014

OTHER PUBLICATIONS

Sy et al. "Generation of Cryptographic Keys from Personal Biometrics: An Illustration Based on Fingerprints." dated Nov. 28, 2021, pp. 1-35.

(Continued)

*Primary Examiner* — Cheng-Feng Huang
(74) *Attorney, Agent, or Firm* — Jason A. Smith; Shumaker, Loop & Kendrick, LLP

(57)          ABSTRACT

A System for managing an operating system using tokenized identity. The system maintains a token repository storing user tokens, Unique-Numbers, and Public-Keys. The system registers users by processing biometric samples to compute a Secret-Key, generating a Unique-Number, and computing a Public-Key. The Public-Key (P1) is stored in the token repository, on the provisioned virtual remote device, and on a thin client application on a personal local device. The Unique-Number is stored on the provisioned virtual remote device and in the token repository. Further, the system receives session signing requests from a proxy-user management application integrated with various device Operating Systems via thin client sessions. The system authenticates users through a two-step process using real-time biometric samples, and comparing computed Real-Time-Unique-Numbers with stored Unique-Numbers. Upon authentication, the system fetches user tokens, identifies corresponding proxy-user management application
(Continued)

100

System 101

Network 106

Application 102

104-1    104-2    104-n

User Device 104 instances, captures user approval, and affixes biometrically authenticated signatures in session logs.

14 Claims, 5 Drawing Sheets

Related U.S. Application Data which is a continuation-in-part of application No. 17/018,273, filed on Sep. 11, 2020, now Pat. No. 11,582,032.

(60) Provisional application No. 63/029,717, filed on May 26, 2020, provisional application No. 62/954,591, filed on Dec. 29, 2019, provisional application No. 62/906,080, filed on Sep. 25, 2019.

(51) Int. Cl.
| | |
|---|---|
| *H04L 9/30* | (2006.01) |
| *H04L 9/40* | (2022.01) |
| *G06F 21/32* | (2013.01) |

(52) U.S. Cl.
CPC .............. *H04L 9/30* (2013.01); *H04L 9/3231* (2013.01); *H04L 9/3247* (2013.01); *H04L 63/0861* (2013.01); *G06F 21/32* (2013.01); *H04L 63/0281* (2013.01); *H04L 63/0823* (2013.01); *H04L 63/102* (2013.01)

(58) Field of Classification Search
CPC ............. H04L 63/0861; H04L 63/0281; H04L 63/0823; H04L 63/102; G06F 21/32
See application file for complete search history.

(56) References Cited

U.S. PATENT DOCUMENTS

| | | | | |
|---|---|---|---|---|
| 7,039,805 | B1* | 5/2006 | Messing | .................. G06F 21/32 |
| | | | | 713/176 |
| 7,093,131 | B1* | 8/2006 | Kobayashi | ............ H04L 9/3247 |
| | | | | 380/258 |
| 7,340,438 | B2 | 3/2008 | Nordman et al. | |
| 7,496,191 | B1 | 2/2009 | Crews et al. | |
| 7,769,633 | B2 | 8/2010 | Jokinen et al. | |
| 8,170,615 | B2 | 5/2012 | Vanska et al. | |
| 9,633,269 | B2 | 4/2017 | Gu et al. | |
| 10,136,191 | B1 | 11/2018 | Lewis et al. | |
| 10,489,826 | B2 | 11/2019 | Matthews et al. | |
| 10,530,577 | B1 | 1/2020 | Pazhoor et al. | |
| 11,252,479 | B2 | 2/2022 | Lewis et al. | |
| 2002/0023220 | A1* | 2/2002 | Kaplan | .................. H04L 9/3247 |
| | | | | 713/176 |
| 2003/0028451 | A1* | 2/2003 | Ananian | ............ G06Q 30/0615 |
| | | | | 705/26.42 |
| 2003/0135740 | A1* | 7/2003 | Talmor | .................. H04L 9/3231 |
| | | | | 713/186 |
| 2006/0085844 | A1* | 4/2006 | Buer | .................... H04L 9/3263 |
| | | | | 726/4 |
| 2007/0271463 | A1* | 11/2007 | Ginter | .............. H04N 21/25875 |
| | | | | 713/176 |
| 2008/0072068 | A1 | 3/2008 | Wang et al. | |
| 2009/0271634 | A1 | 10/2009 | Boult et al. | |
| 2012/0033807 | A1* | 2/2012 | Asim | .................... G06F 21/606 |
| | | | | 380/44 |
| 2014/0006290 | A1* | 1/2014 | Hozanne | ............... H04L 9/3231 |
| | | | | 705/75 |
| 2015/0006895 | A1* | 1/2015 | Irvine | ................. G06F 21/6209 |
| | | | | 713/171 |
| 2015/0046699 | A1* | 2/2015 | Benteo | .................... G06F 21/35 |
| | | | | 713/155 |
| 2015/0095999 | A1* | 4/2015 | Toth | ....................... H04L 9/3263 |
| | | | | 726/6 |
| 2015/0134552 | A1* | 5/2015 | Engels | ................. G06Q 10/087 |
| | | | | 705/318 |
| 2015/0269389 | A1* | 9/2015 | Lee | ..................... H04L 63/0428 |
| | | | | 726/5 |
| 2015/0280921 | A1* | 10/2015 | Geoffrey | ............... H04L 9/3247 |
| | | | | 713/176 |
| 2016/0050213 | A1* | 2/2016 | Storr | ......................... H04L 9/32 |
| | | | | 726/6 |
| 2016/0219046 | A1 | 7/2016 | Ballard et al. | |
| 2017/0141920 | A1* | 5/2017 | Herder, III | ................ H04L 9/30 |
| 2017/0372059 | A1 | 12/2017 | Sindia et al. | |
| 2018/0173871 | A1 | 6/2018 | Toth | |
| 2018/0307859 | A1 | 10/2018 | LaFever et al. | |
| 2019/0097812 | A1* | 3/2019 | Toth | ..................... H04L 9/0841 |
| 2019/0182176 | A1 | 6/2019 | Niewczas | |
| 2019/0306151 | A1 | 10/2019 | Hamel et al. | |
| 2020/0204545 | A1 | 6/2020 | Pacella et al. | |
| 2020/0266989 | A1 | 8/2020 | KrcMaricic-Barackov et al. | |
| 2020/0296093 | A1 | 9/2020 | Hoyos | |
| 2021/0058246 | A1* | 2/2021 | Stolbikov | ............. H04L 9/0841 |
| 2021/0091937 | A1 | 3/2021 | Dange et al. | |
| 2022/0004613 | A1 | 1/2022 | Dange et al. | |
| 2022/0004619 | A1 | 1/2022 | Dange et al. | |
| 2022/0004661 | A1 | 1/2022 | Dange et al. | |
| 2022/0006815 | A1 | 1/2022 | Dange et al. | |
| 2022/0038291 | A1* | 2/2022 | Hong | .................... H04L 9/3231 |

OTHER PUBLICATIONS

Hochrieser, "Online Dating Can Benefit From Identity Verification And Biometric Authentication In 2019", Information Security Buzz, dated Jul. 18, 2019 pp. 1-5.
Arsenova, "Face Liveness Detection For Safe Biometric Authentication And Face Recognition", dated Jan. 27, 2020, pp. 1-10.
M. Kapko et al., "What is Windows Hello? Microsoft's biometrics security system explained" dated Jan. 12, 2021, pp. 1-5.
Mjaaland et al., "Biocryptics: Towards Robust Biometric Public/Private Key Generation", The Norwegian Information Security Conference (NISK) dated 2009, pp. 27-42.
Chandra et al., "Generate an Encryption Key by using Biometric Cryptosystems to secure transferring of Data over a Network", IOSR Journal of Computer Engineering (IOSR-JCE), vol. 12, Issue 1, dated May-Jun. 2013), pp. 1-11.
Office Action dated Nov. 19, 2026, issued in U.S. Appl. No. 18/783,017 (21 pages).

* cited by examiner

100

System 102

Processor 201    I/O interface 202

Memory 203

Module(s)

Token repository module 204

User registration module 205

Session management module 206

Authentication module 207

Signature recording module 208

Other Modules 209

Data 210

Token repository 211

Other data 212

300

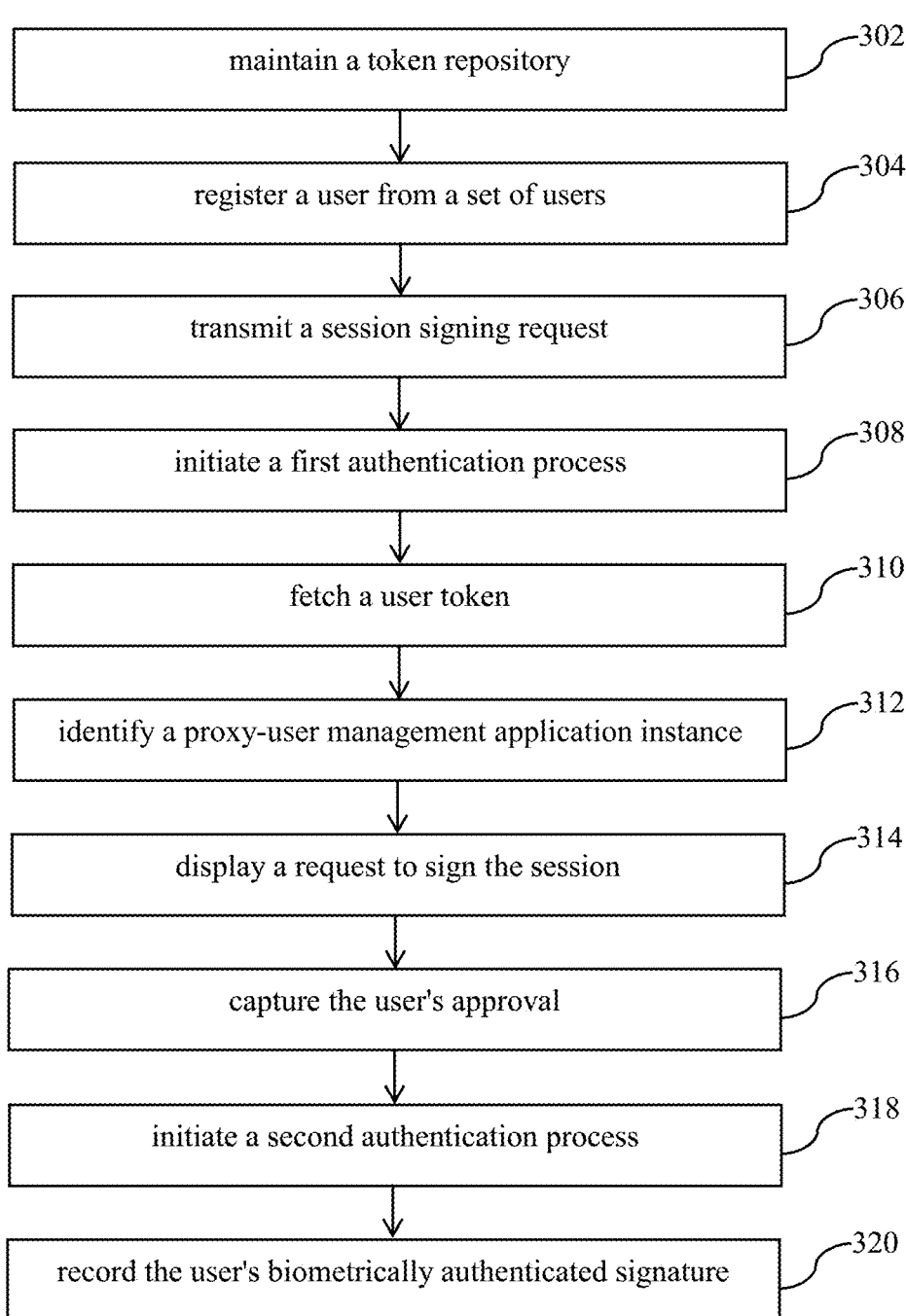

maintain a token repository ～302 register a user from a set of users ～304 transmit a session signing request ～306 initiate a first authentication process ～308 fetch a user token ～310 identify a proxy-user management application instance ～312 display a request to sign the session ～314 capture the user's approval ～316 initiate a second authentication process ～318 record the user's biometrically authenticated signature ～320

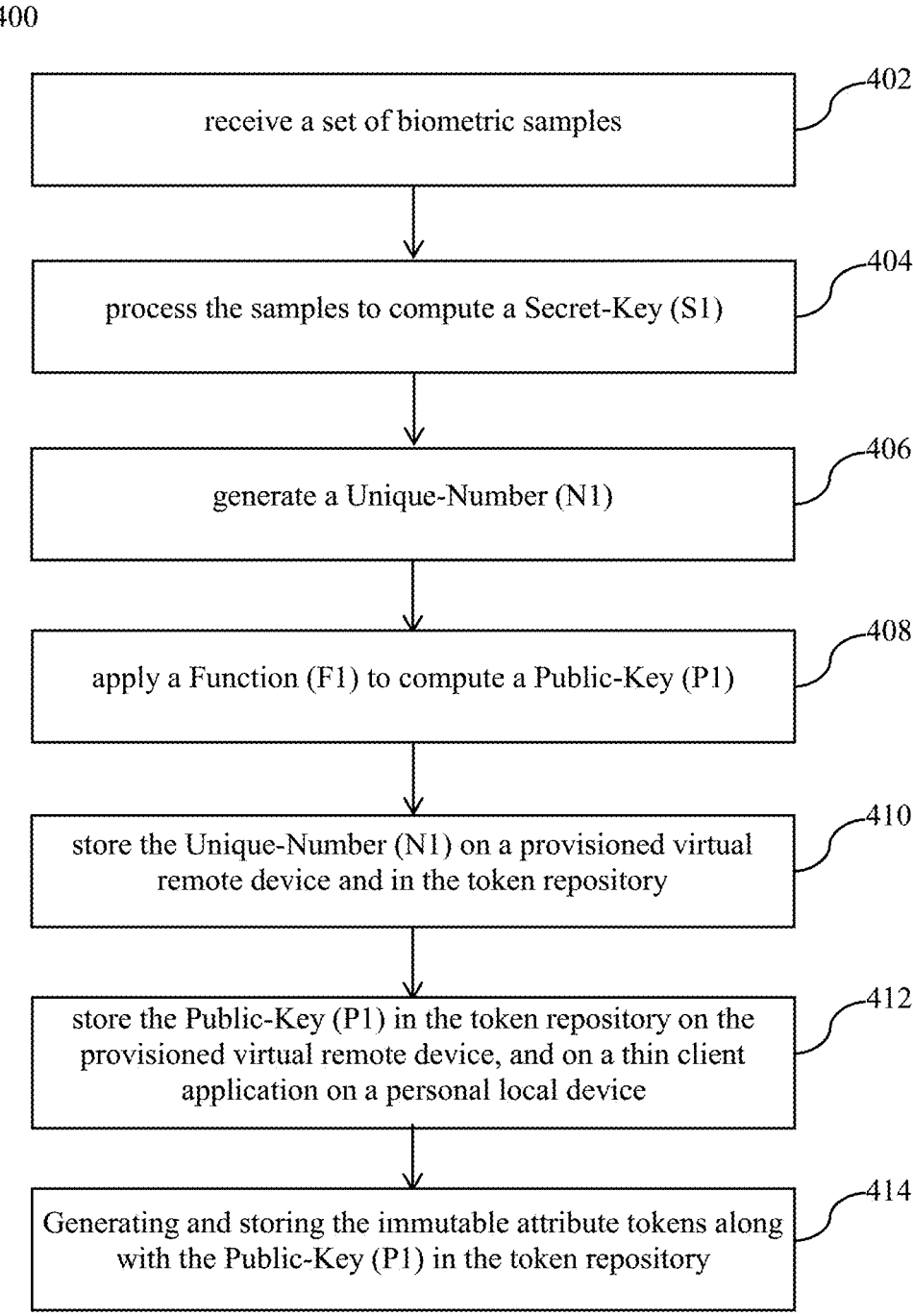

receive a set of biometric samples — 402 process the samples to compute a Secret-Key (S1) — 404 generate a Unique-Number (N1) — 406 apply a Function (F1) to compute a Public-Key (P1) — 408 store the Unique-Number (N1) on a provisioned virtual remote device and in the token repository — 410 store the Public-Key (P1) in the token repository on the provisioned virtual remote device, and on a thin client application on a personal local device — 412

Generating and storing the immutable attribute tokens along with the Public-Key (P1) in the token repository — 414

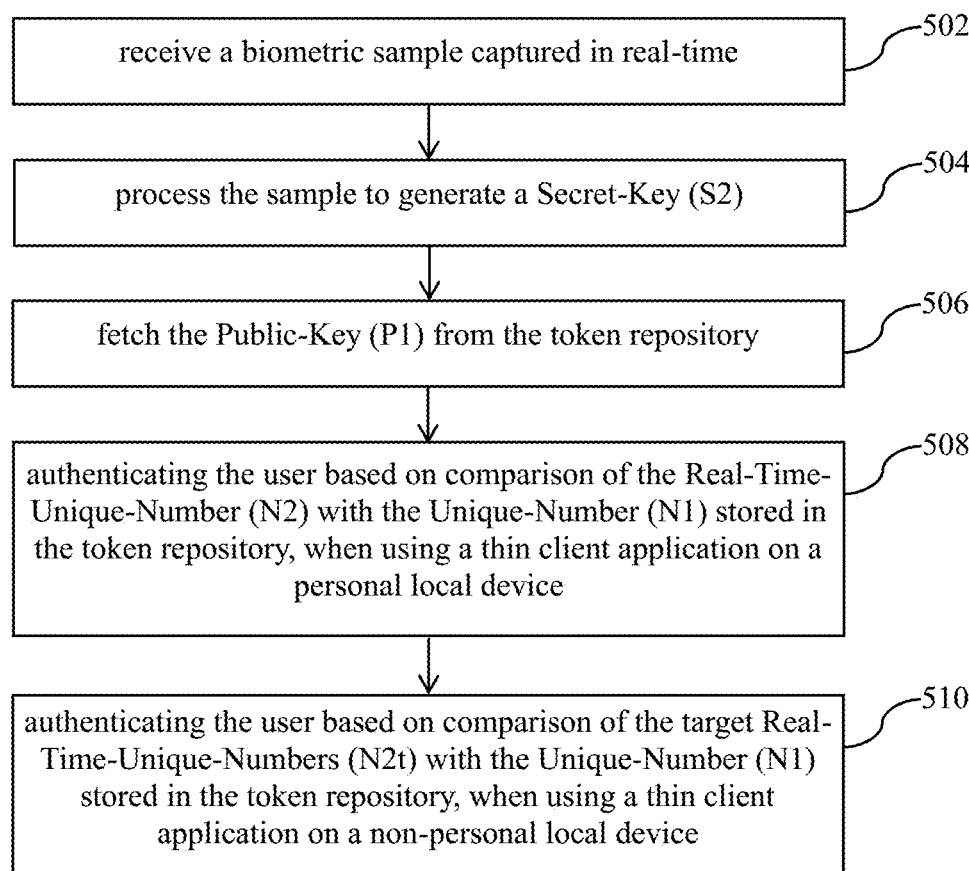

receive a biometric sample captured in real-time ⟋502 process the sample to generate a Secret-Key (S2) ⟋504 fetch the Public-Key (P1) from the token repository ⟋506 authenticating the user based on comparison of the Real-Time-Unique-Number (N2) with the Unique-Number (N1) stored in the token repository, when using a thin client application on a personal local device ⟋508 authenticating the user based on comparison of the target Real-Time-Unique-Numbers (N2t) with the Unique-Number (N1) stored in the token repository, when using a thin client application on a non-personal local device ⟋510

FIGURE 5

SYSTEM AND METHOD FOR MANAGING AN OPERATING SYSTEM USING TOKENIZED IDENTITY

CROSS-REFERENCE TO RELATED APPLICATIONS AND PRIORITY

The present application is a Continuation in Parts (CIP) application of U.S. Complete application Ser. No. 17/481,468, filed on Sep. 22, 2021 entitled "System and method for affixing a signature using biometric authentication", which claims priority from US Complete application Ser. No. 17/018,273 filed on Sep. 11, 2020 entitled "System and method for sharing user preferences without having the user reveal their identity", which claims priority from U.S. Provisional Application No. 62/906,080 filed on Sep. 25, 2019 entitled "Method and system of managing personal and business information", the U.S. Provisional Application No. 62/954,591 filed on Dec. 29, 2019 entitled "Method and system for anonymously matching consumers and businesses", and also claims priority from U.S. Provisional Application No. 63/029,717 filed on May 26, 2020 entitled "Method and system of storing identity and signature using the human body as a node."

TECHNICAL FIELD

The present subject matter described herein, in general, relates to a system and a method for identity management. More specifically, the present subject matter relates to a system and method for managing an Operating System using tokenized identity and session authentication using biometric authentication.

BACKGROUND

The subject matter discussed in the background section should not be assumed to be prior art merely because of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

The dawn of the internet era and the subsequent emergence and scaling of mobile computing have resulted in the vast majority of people accessing online services on dedicated devices that they own or co-own. This has resulted in the establishment of a paradigm where a significant portion, if not all, of personalized computing occurs on the user's device. However, this paradigm poses several issues. The user's device needs to be operational at all times for the user to access any services, and it must always be secured against unauthorized access. If the device becomes inoperable or if an unauthorized user accesses it, the actual user's services are compromised. Additionally, the operating system installed on the device must be regularly updated to avoid software bugs and incompatibilities that may degrade the services the user can access.

The current paradigm also imposes greater hardware requirements on devices to run the operating system locally, which may result in degraded performance if these requirements are not met. Furthermore, mobile computing devices are typically used by people explicitly authorized to use them, making it difficult for a user to borrow someone else's device and have it instantly personalized for their use.

As technology advances, new forms of user representation have emerged, each with its own authentication challenges. AI Agents, Digital Twins, Robot Twins, and Generative Twins may all represent a biological person in various contexts, and there is a pressing need for these entities to present their authorization for such representation. AI Agents may interact with other people and organizations on behalf of a user. Digital Twins, which are virtual likenesses of biological persons, may represent users online. Robot Twins, physical humanoid robots controlled by AI, may represent biological persons in base physical reality. Generative Twins, virtual likenesses generated on the fly as ephemeral instances, may represent biological persons online. In all these cases, there is a critical need for these entities to present their authorization to represent the biological person.

Operating systems present a unique challenge in this landscape. As the platform upon which all other applications are built, they require far more information about the user than typical applications. This gives operating system providers extraordinary access to exceptionally deep and broad information about their users' data and online activities. Paradoxically, it also puts an incredibly high burden on the operating system provider to safeguard their users' accounts from hacking attacks and data breaches at all times.

Thus, users have long felt the need to maintain their privacy, avail themselves of personalized services, remotely control multiple devices simultaneously, and do all of the above activities without a corporation having access to their private data. The present invention addresses these long-felt needs and provides solutions to the aforementioned issues.

SUMMARY

This summary is provided to introduce concepts related to a system and method for managing an Operating System using tokenized identity, which are further described below in the detailed description. This summary is not intended to identify essential features of the claimed subject matter nor is it intended for use in determining or limiting the scope of the claimed subject matter.

In one implementation, a system for managing an Operating System using tokenized identity is disclosed. The system comprises a processor and a memory coupled to the processor. The processor is configured to execute instructions stored in the memory for maintaining a token repository that stores a user token, a Unique-Number, and a Public-Key for each user in a set of users. The system registers a user, from the set of users, by receiving a set of biometric samples corresponding to one or more biometric factors, processing these samples to compute a Secret-Key, generating a Unique-Number using a random number generation algorithm, and applying a Function to the Secret-Key and Unique-Number to compute a Public-Key. The Unique-Number and Public-Key are stored on a provisioned virtual remote device, in the token repository, and on a thin client application on a personal local device. Further, the system is configured for receiving a user input on the thin client application corresponding to one or more immutable attributes of the user, generating an immutable attribute token for each immutable attribute, and storing the immutable attribute tokens along with the Public-Key (P1) in the token repository.

The system receives session signing requests from a proxy-user management application integrated with a device Operating System (OS). These requests, corresponding to user-authenticated sessions, are received via a thin client session running on a client device. The system then initiates a first authentication process, which involves receiving and processing a real-time biometric sample to generate a new Secret-Key. When using a thin client application on a personal local device, the system is configured for selecting the Public-Key (P1) from the thin client application, fetching the corresponding Public-Key (P1) from the token repository, computing a Real-Time-Unique-Number (N2) using the Public-Key (P1), the Secret-Key (S2) and the Function (F1), and authenticating the user based on comparison of the Real-Time-Unique-Number (N2) with the Unique-Number (N1) stored in the token repository). When using a thin client application on a non-personal local device, the system is configured for receiving a user input corresponding to the one or more immutable attributes of the user, generating a token corresponding to each of the one or more immutable attributes, querying the token repository for the one or more tokens, fetching the public-keys (P1-Pn) corresponding to the one or more tokens, computing a Real-Time-Unique-Number (N2) for each Public-Key (P1-Pn), the Secret-Key (S2) and the Function (F1), identifying a target Real-Time-Unique-Number (N2t), wherein the target Real-Time-Unique-Number (N2t) matches the Unique-Number (N1) stored in the token repository, and authenticating the user based on comparison of the target Real-Time-Unique-Numbers (N2t) with the Unique-Number (N1) stored in the token repository.

Upon successful authentication, the system fetches a user token corresponding to the Unique-Number, identifies the appropriate proxy-user management application instance, displays a request to sign the session, captures the user's approval, initiates a second authentication process, and records the user's biometrically authenticated signature in the session log.

In another implementation, a method for managing an Operating System using tokenized identity is disclosed. The method comprises maintaining a token repository that stores a user token, a Unique-Number, and a Public-Key for each user in a set of users. The method includes registering a user by receiving a set of biometric samples corresponding to one or more biometric factors, processing these samples to compute a Secret-Key, generating a Unique-Number using a random number generation algorithm, and applying a Function to the Secret-Key and Unique-Number to compute a Public-Key. The method then stores the Unique-Number and Public-Key on a provisioned virtual remote device, in the token repository, and on a thin client application on a personal local device. Further, the method comprises steps of receiving a user input on the thin client application corresponding to one or more immutable attributes of the user, generating an immutable attribute token for each immutable attribute, and storing the immutable attribute tokens along with the Public-Key (P1) in the token repository.

The method involves receiving session signing requests from a proxy-user management application integrated with a device Operating Systems (OS). These requests, corresponding to user-authenticated sessions, are received via a thin client session running on a client device. The method then initiates a first authentication process, which involves receiving and processing a real-time biometric sample to generate a new Secret-Key. When using a thin client application on a personal local device, the method comprises steps of selecting the Public-Key (P1) from the thin client application, fetching the corresponding Public-Key (P1)

from the token repository, computing a Real-Time-Unique-Number (N2) using the Public-Key (P1), the Secret-Key (S2) and the Function (F1), and authenticating the user based on comparison of the Real-Time-Unique-Number (N2) with the Unique-Number (N1) stored in the token repository). Alternately, when using a thin client application on a non-personal local device, the method comprises steps of receiving a user input corresponding to the one or more immutable attributes of the user, generating a token corresponding to each of the one or more immutable attributes, querying the token repository for the one or more tokens, fetching the public-keys (P1-Pn) corresponding to the one or more tokens, computing a Real-Time-Unique-Number (N2) for each Public-Key (P1-Pn), the Secret-Key (S2) and the Function (F1), identifying a target Real-Time-Unique-Number (N2t), wherein the target Real-Time-Unique-Number (N2t) matches the Unique-Number (N1) stored in the token repository, and authenticating the user based on comparison of the target Real-Time-Unique-Numbers (N2t) with the Unique-Number (N1) stored in the token repository.

Upon successful authentication, the method fetches a user token corresponding to the Unique-Number, identifies the appropriate proxy-user management application instance, displays a request to sign the session, captures the user's approval, initiates a second authentication process, and records the user's biometrically authenticated signature in the session log.

In yet another embodiment, a non-transitory computer-readable storage medium storing a computer program product comprising computer-executable instructions for Identity Management is disclosed. The computer-executable instructions, when executed by one or more processors, cause the one or more processors to perform the method steps as stated above.

Definitions

'Proxy-user management application' refers to a software application that acts on behalf of the user to manage their identity and permissions across different devices and systems. The Proxy-user management application handles the user's login and authorization processes.

'Thin client' refers to a lightweight application in which most of the processing happens on a remote server rather than on the user's local device.

'Provisioned virtual remote device' refers to a personalized operating system instance.

'Token repository' refers to a secure database that stores anonymized identifiers for all users.

'Unique-Number' refers to a random unique number used to identify each user in the system.

'Public-Key and Secret-Key' refer to a cryptographic key value pair used for authentication. The public key can be shared, while the secret key is kept private.

'Function (F1)' refers to a mathematical operation used to create or verify the keys.

'Device Operating System (OS)' refers to the software that runs on a device, managing its basic functions.

'Biometrically authenticated signature' refers to a cryptographic signature verified using entropy on biological factors (such as face or fingerprints).

BRIEF DESCRIPTION OF DRAWINGS

The detailed description is described with reference to the accompanying Figures. The same numbers are used throughout the drawings to refer to features and components.

FIG. 3 illustrates a method 300 for managing an Operating System using tokenized identity, in accordance with an embodiment of the present disclosure.

FIG. 4 illustrates a method 400 for user registration, in accordance with an embodiment of the present disclosure.

FIG. 5 illustrates a method 500 for user authentication, in accordance with an embodiment of the present disclosure.

DETAILED DESCRIPTION

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

Figure 1:
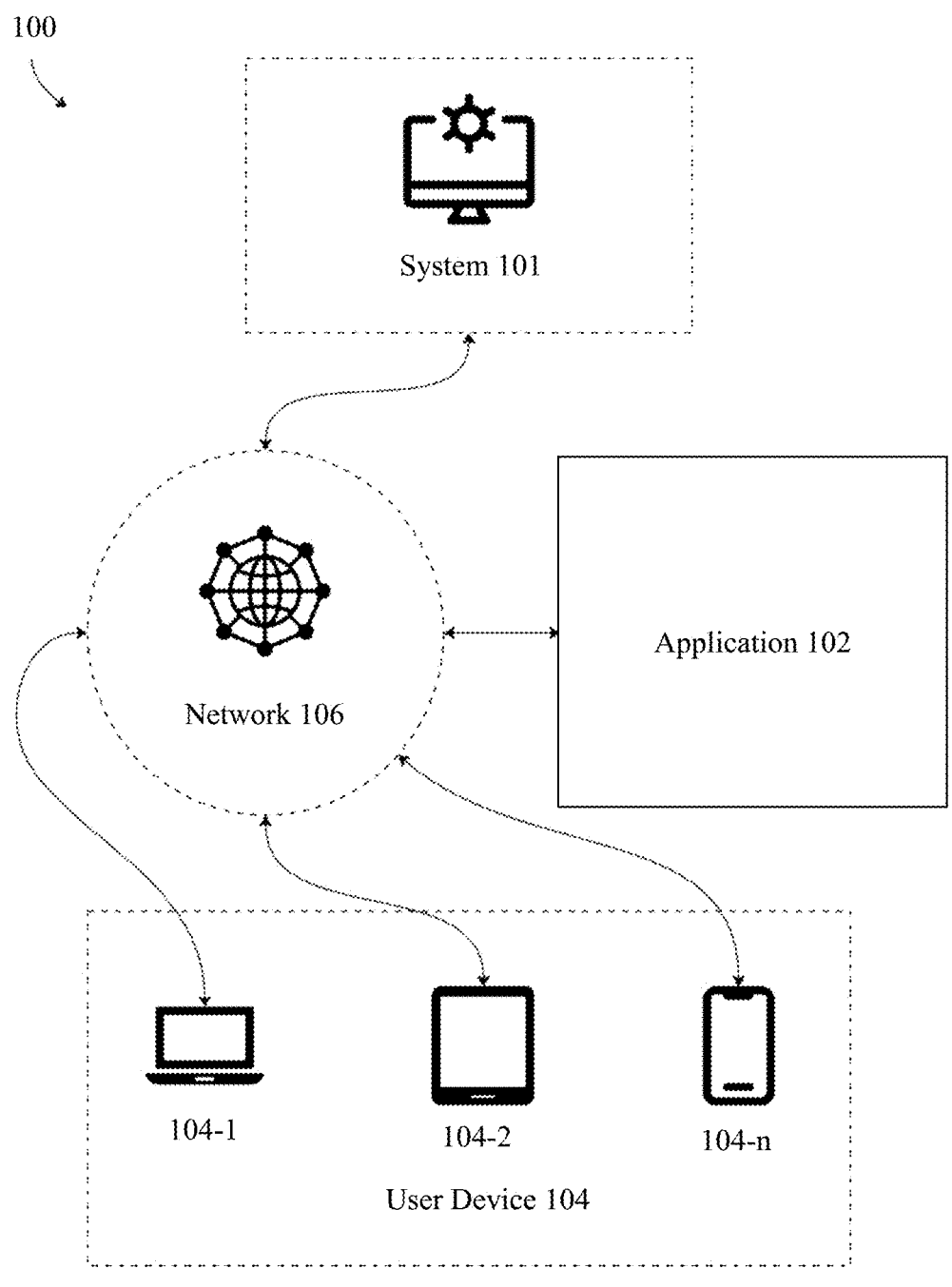
FIG. 1 illustrates a network implementation 100 of a system 101 for managing an Operating System using tokenized identity and biometric authentication, in accordance with an embodiment of the present disclosure.

Referring now to FIG. 1, implementation 100 of system 101 for managing an Operating System using tokenized identity and biometric authentication is illustrated, in accordance with an embodiment of the present subject matter. In one embodiment, the system 101 may comprise a processor and a memory. Further, the system 101 may be connected to user devices and Applications through a network 104. It may be understood that the system 101 may be communicatively coupled with multiple users through one or more User devices 103-1, 103-2, 103-3 . . . , 103-n and Applications 102-1, 102-2, 102-3 . . . , 102-n collectively referred to as a user device 103 and Applications 102.

In one embodiment, the network 104 may be a cellular communication network used by user devices 103 such as mobile phones, tablets, or a virtual device. In one embodiment, the cellular communication network may be the Internet. The user device 103 may be any electronic device, communication device, image capturing device, machine, software, automated computer program, a robot or a combination thereof. Further the Application 102 may be any networking platform, media platform, messaging platform, ecommerce platform, or any other application platform. The system 101 may be configured to register users over the system 101. Further, the system may be configured to authenticate the user, each time the user makes a request to access the system 101.

In one embodiment, the user devices 103 may support communication over one or more types of networks in accordance with the described embodiments. For example, some user devices and networks may support communications over a Wide Area Network (WAN), the Internet, a telephone network (e.g., analog, digital, POTS, PSTN, ISDN, xDSL), a mobile telephone network (e.g., CDMA, GSM, NDAC, TDMA, E-TDMA, NAMPS, WCDMA, CDMA-2000, UMTS, 3G, 4G), a radio network, a television network, a cable network, an optical network (e.g., PON), a satellite network (e.g., VSAT), a packet-switched network, a circuit-switched network, a public network, a private net-work, and/or other wired or wireless communications network configured to carry data. The aforementioned user devices 103 and network 104 may support wireless local area network (WLAN) and/or wireless metropolitan area network (WMAN) data communications functionality in accordance with Institute of Electrical and Electronics Engineers (IEEE) standards, protocols, and variants such as IEEE 802.11 ("WiFi"), IEEE 802.16 ("WiMAX"), IEEE 802.20x ("Mobile-Fi"), and others.

In one embodiment, the user devices 103 are enabled with biometric scanning capabilities. In one embodiment, the Application 102 may be a thin client application. The user registration process is further illustrated with the block diagram in FIG. 2.

Figure 2:
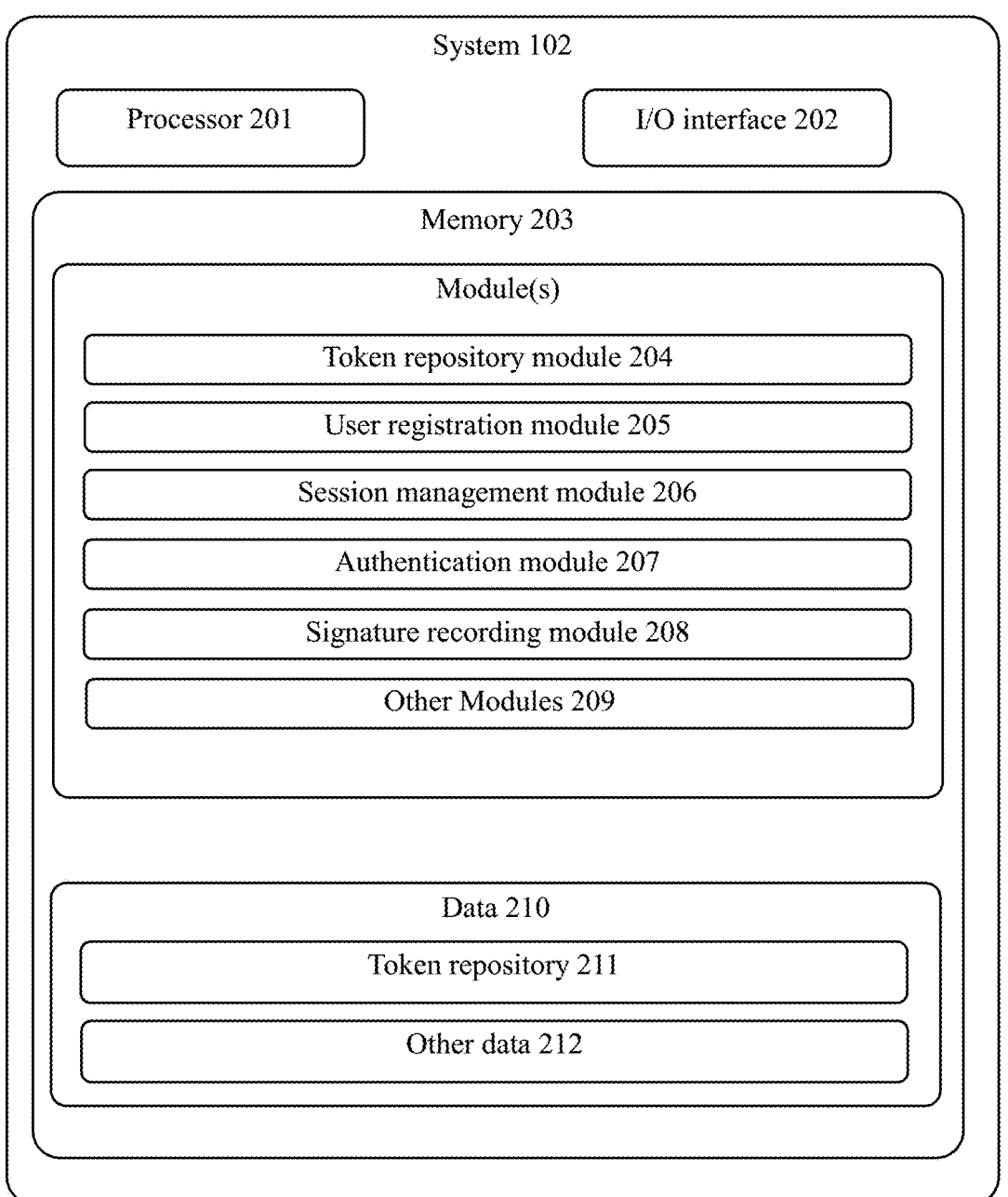
FIG. 2 illustrates components of the system 101 for managing an Operating System using tokenized identity, in accordance with an embodiment of the present disclosure.

Referring now to FIG. 2, various components of the System 101 are illustrated, in accordance with an embodiment of the present subject matter. As shown, the system 101 may include at least one processor 201, an I/O Interface 202 and a memory 203. The memory 203 consists of a set of modules. The set of modules may include a token repository module 204, a user registration module 205, a session management module 206, an authentication module 207, a signature recording module 208, and other modules 209. In one embodiment, the at least one processor 201 is configured to fetch and execute computer-readable instructions, stored in the memory 203, corresponding to each module.

In one embodiment, the memory 203 may include any computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and memory cards.

In one embodiment, the programmed instructions may include routines, programs, objects, components, data structures, etc., which perform particular tasks, functions, or implement particular abstract data types. The data 210 may comprise a token repository 211, and other data 212. The token repository 211 is configured to maintain a user token, a Unique-Number, and a Public-Key corresponding to each user from a set of users. The token repository 211 may be hosted on a centralized server, ensuring secure and controlled access to this critical information. The other data 212, amongst other things, serves as a repository for storing data processed, received, and generated by one or more components and programmed instructions.

In one embodiment, the processor 201 may be configured for executing programmed instructions corresponding to the user registration module 205 for registering a user over the system 101. For the purpose of registration, the processor 201 may receive a set of biometric samples of the user, corresponding to one or more biometric factors. These factors may include, but are not limited to, fingerprints, facial features, voice patterns, retinal scans, and palm vein patterns. The processor 201 is configured to process the set of biometric samples to compute a Secret-Key (S1) corresponding to the user. Further, the processor 201 is configured to generate a Unique-Number (N1) using a random number generation algorithm. The processor 201 then applies a Function (F1) to the Secret-Key (S1) and the Unique-Number (N1) to compute a Public-Key (P1). The Unique-Number (N1) and the Public-Key (P1) are then stored on a provisioned virtual remote device, in the token repository 211, and on a thin client application on a personal local device. The processor 201 then receives a user input on the thin client application corresponding to one or more immutable attributes of the user, generates an immutable attribute token for each immutable attribute, and stores the immutable attribute tokens along with the Public-Key (P1) in the token repository. The provisioned virtual remote device is a virtual machine corresponding to the user, hosted on a remote server. For example, when John Doe registers, his facial scan or fingerprints may be used to generate his Secret-Key, which is then used along with his Unique-Number to create his Public-Key.

The processor 201 is configured to execute programmed instructions corresponding to the session management module 206 for handling session signing requests. The session management module 206 receives session signing requests from a proxy-user management application integrated with various device Operating Systems (OS). These requests correspond to user-authenticated sessions and are received via a thin client session running on a client device/user device 104. For instance, if John Doe wants to authorize his AI Agent to perform an action on his behalf, the proxy-user management application would send a session signing request through the thin client on John's user device 104.

The authentication module 207 is responsible for the first and second authentication processes. When executed by the processor 201, it receives a biometric sample captured from the user in real-time, processes the sample to generate a Secret-Key (S2). When using a thin client application on a personal local device, the processor 201 is configured for selecting the Public-Key (P1) from the thin client application, fetching the corresponding Public-Key (P1) from the token repository, computing a Real-Time-Unique-Number (N2) using the Public-Key (P1), the Secret-Key (S2) and the Function (F1), and authenticating the user based on comparison of the Real-Time-Unique-Number (N2) with the Unique-Number (N1) stored in the token repository). When using a thin client application on a non-personal local device, the processor 201 is configured for receiving a user input corresponding to the one or more immutable attributes of the user, generating a token corresponding to each of the one or more immutable attributes, querying the token repository for the one or more tokens, fetching the public-keys (P1-Pn) corresponding to the one or more tokens, computing a Real-Time-Unique-Number (N2) for each Public-Key (P1-Pn), the Secret-Key (S2) and the Function (F1), identifying a target Real-Time-Unique-Number (N2$t$), wherein the target Real-Time-Unique-Number (N2$t$) matches the Unique-Number (N1) stored in the token repository, and authenticating the user based on comparison of the target Real-Time-Unique-Numbers (N2$t$) with the Unique-Number (N1) stored in the token repository. For example, when John Doe tries to authenticate, he might provide a face scan, which is used to generate a new Secret-Key. This is then used with his stored Public-Key (P1) to create a Real-Time-Unique-Number (N2), which is compared to his stored Unique-Number (N1) for authentication.

Upon successful authentication, the processor 201 executes instructions to fetch a user token (T1) corresponding to the Unique-Number (N1) from the token repository 211. It then identifies, from a set of proxy-user management application instances, a proxy-user management application instance corresponding to the user token (T1). This ensures that John Doe's session is correctly associated with his specific instance of the proxy-user management application.

The session management module 206 also handles displaying a request to sign the proxy-user management application session and the corresponding device OS session, and captures the user's approval to affix the user's biometrically authenticated signature to the session. For example, John might see a prompt on his user device 104 asking him to confirm that he wants to authorize his AI Agent to take a particular action.

Finally, the signature recording module 208, when executed by the processor 201, records the user's biometrically authenticated signature in the proxy-user management application session log, upon successful completion of both the first and second authentication processes. This creates a biometrically authenticated record of John's authorization for the AI Agent's actions.

It's important to note that the system 101 is designed to work across various computing environments. When the user is logged into a computer, the user's biometrically authenticated signature in the proxy-user management application session log corresponds to the user's authorization for the computer operation session. For example, if John logs into his work computer, his biometric signature authorizes that entire computer session. Similarly, when an AI Agent represents the user when interacting with others, the signature corresponds to the user's authorization for the AI Agent operation session. For instance, if John's AI Agent is negotiating a contract on John's behalf, John's biometric signature authorizes his AI Agent's actions. When John's personal robot works in a factory, its attendance is verified by John's biometric signature authorizing the robot session.

The session signing request may be triggered by the proxy-user management application based on a set of predefined rules, or generated upon receiving a user command to launch the proxy-user management application session. For example, a rule might require authentication for any financial transaction over $1000, or John might manually authorize every session when his Digital Twin participates in a meeting.

The system 101 provides a secure, privacy-preserving method for authentication across various computing environments, including but not limited to traditional devices, AI agents, digital twins, robots, humanoid robots and other emerging technologies. The system 101 ensures that whether John is using his computer, being represented by an AI in a negotiation, or having a Robot work in a factory on his behalf, his identity is securely authenticated and his authorizations are verifiably recorded.

Referring to FIG. 3, a method 300 for managing an Operating System using tokenized identity is illustrated, in accordance with an embodiment of the present subject matter.

At Step 302, the method involves maintaining a token repository 211. The token repository 211 is a centralized database configured to maintain a user token, a Unique-Number, and a Public-Key corresponding to each user from a set of users. This repository is crucial for the system's security and efficiency. The user token serves as a unique identifier for each user within the system. The Unique-Number is a randomly generated number associated with each user, while the Public-Key is used in the encryption process for authentication. For example, for a user John Doe, the token repository 211 might store his unique user token, his Unique-Number, and his Public-Key. The token repository 211 is hosted on a server.

At Step 304, the method proceeds to register a user. The user registration process includes receiving a set of biometric samples of the user corresponding to one or more biometric factors. These factors include but are not limited to facial features, fingerprints, voice patterns, retinal scans, or palm vein patterns. The system 101 then processes these biometric samples to compute a Secret-Key (S1) unique to the user. Next, it generates a Unique-Number (N1) using a random number generation algorithm. The system 101 then applies a Function (F1) to the Secret-Key (S1) and the Unique-Number (N1) to compute a Public-Key (P1). Finally, The Unique-Number (N1) and the Public-Key (P1) are then stored on a provisioned virtual remote device, in the token repository 211, and on a thin client application on a personal local device. The processor 201 then receives a user input on the thin client application corresponding to one or more immutable attributes of the user, generates an immutable attribute token for each immutable attribute, and stores the immutable attribute tokens along with the Public-Key (P1) in the token repository. The provisioned virtual remote device is a virtual machine, corresponding to the user, hosted on a remote server.

At Step 306, the method involves transmitting to a user, a session signing request from a proxy-user management application. This application is integrated with a device Operating System (OS), which could be an AI Agent OS, a Digital Twin OS, a Robot Twin OS, a Generative Twin OS, or similar systems. The session signing request corresponds to a user-authenticated session on the device OS. This request is received via a thin client session running on a client device. For instance, if John Doe wants to start a session on his AI assistant, the proxy-user management application would send a session signing request to a thin client on John's device—user device 104. This step ensures that every session is explicitly authorized by the user, maintaining security and user control across various types of computing environments. It's important to note that the proxy-user management application is integrated with the device OS, allowing for seamless operation across various OS types. The session signing request can be triggered either based on predefined rules set within the proxy-user management application or upon receiving a direct user command to launch a session. This flexibility allows the system 101 to balance security with user convenience. Furthermore, the provisioned virtual remote device mentioned in the registration process is a virtual machine corresponding to the user, hosted on a remote server. This architecture, along with the server hosting the token repository, ensures that user access is not dependent on possession of a specific personal physical device. User access can be obtained via any compatible device.

At Step 308, the method initiates a first authentication process for authenticating the user via the thin client session. This process involves several sub-steps: First, it receives a biometric sample captured from the user in real-time. Then, it processes this biometric sample to generate a Secret-Key (S2). When using a thin client application on a personal local device, the system 101 is configured for selecting the Public-Key (P1) from the thin client application, fetching the corresponding Public-Key (P1) from the token repository, computing a Real-Time-Unique-Number (N2) using the Public-Key (P1), the Secret-Key (S2) and the Function (F1), and authenticating the user based on comparison of the Real-Time-Unique-Number (N2) with the Unique-Number (N1) stored in the token repository. When using a thin client application on a non-personal local device, the processor 201 is configured for receiving a user input corresponding to the one or more immutable attributes of the user, generating a token corresponding to each of the one or more immutable attributes, querying the token repository for the one or more tokens, fetching the public-keys (P1-Pn) corresponding to the one or more tokens, computing a Real-Time-Unique-Number (N2) for each Public-Key (P1-Pn), the Secret-Key (S2) and the Function (F1), identifying a target Real-Time-Unique-Number (N2*t*), wherein the target Real-Time- Unique-Number (N2*t*) matches the Unique-Number (N1) stored in the token repository, and authenticating the user based on comparison of the target Real-Time-Unique-Numbers (N2*t*) with the Unique-Number (N1) stored in the token repository. This process ensures that the person attempting to access the system is indeed the registered user, without storing or transmitting the actual biometric data.

At Step 310, upon successful authentication, the method fetches from the token repository, a user token (T1) corresponding to the Unique-Number (N1). This step links the authenticated biometric input to the user's digital identity within the system, ensuring that the correct user profile is accessed for the session.

At Step 312, the method identifies, from a set of proxy-user management application instances, a proxy-user management application instance corresponding to the user token (T1). This step is crucial for maintaining the separation and security of different users' sessions, especially in multi-user or shared device environments.

At Step 314, the method displays a request to sign the proxy-user management application session and the corresponding device OS session. This step presents the user with a clear prompt to authorize the specific session they are about to enter, ensuring informed consent and maintaining a clear audit trail of user actions.

At Step 316, the method captures the user's approval to affix the user's biometrically authenticated signature to the session. This could involve the user providing another biometric input or confirming through a secure interface on the thin client.

At Step 318, the method initiates a second authentication process. This second process serves as an additional security measure, ensuring that the user who initiated the session is the same user who is approving it. The process follows the same steps as the first authentication process described in Step 308.

At Step 320, upon successful second authentication, the method records the user's biometrically authenticated signature in the proxy-user management application session log. This serves as a secure, verifiable record of the user's authorization for the session.

It's important to note that this method applies to various types of sessions and device operating systems. For instance, when the user is logged into a computer, the user's biometrically authenticated signature in the proxy-user management application session log corresponds to the user's authorization for the computer operation session. Similarly, when an AI Agent represents the user when interacting with others, the user's biometrically authenticated signature corresponds to the user's authorization for the AI Agent operation session. The same principle applies to Robot operations, where the Robot represents the user when interacting with others.

Furthermore, the session signing request may be triggered by the proxy-user management application session based on a set of predefined rules, or it may be generated upon receiving a user command to launch the proxy-user management application session. This flexibility allows the system 101 to balance security with user convenience.

Through these steps, method 300 provides a robust, secure, and privacy-preserving approach for managing an Operating System using tokenized identity and session authentication across various computing environments, including traditional computers, AI agents, digital twins, robots, and other emerging technologies.

FIG. 4 illustrates a method 400 for user registration, in accordance with an embodiment of the present disclosure.

Method 400 corresponds to step 304 of method 300 and provides a detailed breakdown of the user registration process.

At Step 402, the method begins by receiving a set of biometric samples of the user corresponding to one or more biometric factors. These biometric factors may include, but are not limited to facial features, fingerprints, voice patterns, retinal scans, and palm vein patterns. For example, the system might capture multiple fingerprint scans from different fingers, or combine a facial scan with a voice sample. The use of multiple biometric factors enhances the security and reliability of the system. These samples are captured using appropriate biometric scanners or sensors integrated with or connected to the user's device.

At Step 404, the method processes the set of biometric samples to compute a Secret-Key (S1) corresponding to the user. This step involves complex algorithmic processing of the raw biometric data to extract unique, consistent features that can be used to generate a cryptographic key. The Secret-Key (S1) is a critical component of the system's security, as it forms the basis for all subsequent authentication processes. Importantly, this Secret-Key is never stored anywhere in the system, enhancing security by ensuring that even if the system 101 is compromised, the user's biometric information cannot be reconstructed.

At Step 406, the method generates a Unique-Number (N1) using a random number generation algorithm. This Unique-Number (N1) serves as an identifier for the user within the system. The random number generation algorithm ensures that each user's Unique-Number (N1) is distinct and unpredictable, further enhancing the system's security.

At Step 408, the method applies a Function (F1) to the Secret-Key (S1) and the Unique-Number (N1) to compute a Public-Key (P1). The Function (F1) is typically based on asymmetric cryptography principles, where the Secret-Key and Public-Key form a paired set. The specific nature of Function (F1) depends on the chosen cryptographic algorithm, but it ensures that while the Public-Key can be derived from the Secret-Key, the reverse is computationally infeasible.

At Step 410, the method stores the Unique-Number (N1) on a provisioned virtual remote device and in a token repository 211. The provisioned virtual remote device is a virtual machine corresponding to the user, hosted on a remote server. This approach ensures that the Unique-Number (N1) is not stored locally on any physical device the user might use, enhancing both security and flexibility. The token repository 211, as mentioned earlier, is hosted on a centralized server, providing a secure, controlled-access storage for this information.

At Step 412, the method stores the Public-Key (P1) in the token repository, on the provisioned virtual remote device, and on a thin client application on a personal local device.

At Step 414, the method comprises steps for receiving a user input on the thin client application corresponding to one or more immutable attributes of the user. Based on the one or more immutable attributes, the method comprises generating an immutable attribute token for each immutable attribute. Finally, the method comprises storing the immutable attribute tokens along with the Public-Key (P1) in the token repository. Like the Unique-Number, the Public-Key (P1) is stored centrally, on the user's virtual machine, and on the thin client application on a personal local device. This dual storage ensures that the Public-Key (P1) is always available for authentication processes, whether initiated from the user's virtual machine or from the system.

It's important to note that throughout this registration process, the system never stores the user's raw biometric data or the computed Secret-Key (S1). Instead, it stores only the Unique-Number (N1) and the Public-Key (P1), which cannot be used to reconstruct the user's biometric information. This approach provides a high level of security and privacy protection for the user.

The registration process described in method 400 sets up the foundational elements required for the secure, biometric-based authentication used in subsequent sessions. By carefully managing the creation and storage of cryptographic elements, this method enables strong user authentication without compromising user privacy or system security.

FIG. 5 illustrates a method 500 for user authentication, in accordance with an embodiment of the present disclosure. Method 500 corresponds to steps 308 and 318 of method 300 and provides a detailed breakdown of the authentication process used in both the first and second authentication process.

At Step 502, the method begins by receiving a biometric sample captured from the user in real-time. This step is initiated when a user attempts to access the system or sign a session. The biometric sample could be any of the biometric factors used during the registration process, such as a fingerprint, facial scan, voice sample, retinal scan, or palm vein pattern. For example, if the user is attempting to authorize an AI Agent to act on their behalf, the user might be prompted to place their finger on a fingerprint scanner or look into a camera for facial recognition. The key aspect of this step is that the biometric sample is captured in real-time, ensuring that it's coming from a live user rather than a recorded or spoofed input. For this purpose, the system 101 may also implement liveness detection algorithms.

At Step 504, the method processes the biometric sample to generate a Secret-Key (S2). This step mirrors the process used during registration, applying the same algorithms to extract unique features from the biometric sample and convert them into a cryptographic key. It's important to note that due to natural variations in biometric samples (e.g., slightly different finger placement on a scanner), the Secret-Key (S2) generated at this step is unlikely to be exactly identical to the Secret-Key (S1) generated during registration. However, the algorithms used may be designed to produce consistent results for the same user, within an acceptable margin of variation.

At Step 506, the method fetches the Public-Key (P1) corresponding to the user from the token repository. This Public-Key (P1) was stored during the registration process and serves as the user's identifier within the system 101. The system 101 can retrieve this Public-Key based on the user's claimed identity or other session information.

At Step 508, when using a thin client application on a personal local device, the system 101 is configured for selecting the Public-Key (P1) from the thin client application, fetching the corresponding Public-Key (P1) from the token repository, computing a Real-Time-Unique-Number (N2) using the Public-Key (P1), the Secret-Key (S2) and the Function (F1), and authenticating the user based on comparison of the Real-Time-Unique-Number (N2) with the Unique-Number (N1) stored in the token repository. This step is the core of the authentication process. The Function (F1) is the same one used during registration, and it has the property that when applied to the correct Secret-Key and Public-Key pair, it will produce the original Unique-Number. In other words, if the biometric sample provided is genuine and from the correct user, the Real-Time-Unique- Number (N2) computed in this step should match the Unique-Number (N1) stored during registration.

At Step 510, when using a thin client application on a non-personal local device, the system 101 is configured for receiving a user input corresponding to the one or more immutable attributes of the user, generating a token corresponding to each of the one or more immutable attributes, querying the token repository for the one or more tokens, fetching the public-keys (P1-Pn) corresponding to the one or more tokens, computing a Real-Time-Unique-Number (N2) for each Public-Key (P1-Pn), the Secret-Key (S2) and the Function (F1), identifying a target Real-Time-Unique-Number (N2*t*), wherein the target Real-Time-Unique-Number (N2*t*) matches the Unique-Number (N1) stored in the token repository, and authenticating the user based on comparison of the target Real-Time-Unique-Numbers (N2*t*) with the Unique-Number (N1) stored in the token repository.

In both the above scenarios, the method authenticates the user based on comparison of the Real-Time-Unique-Number (N2) with the Unique-Number (N1). If these numbers match, the user is authenticated. If they don't match, the authentication fails.

This authentication process has several key advantages:

Privacy: The user's actual biometric data is never stored or transmitted. Only the Public-Key and Unique-Number, which cannot be used to reconstruct the biometric data, are stored.

Security: Even if the token repository is compromised, an attacker cannot use the stored information to impersonate a user, as the Secret-Key derived from the actual biometric input is required for authentication.

Flexibility: This same process can be used for authenticating users across various types of sessions and devices, including traditional computers, AI Agents, Digital Twins, Robot Twins, and Generative Twins.

Real-time Verification: By requiring a real-time biometric sample for each authentication, the system protects against replay attacks or the use of stolen biometric data.

The method 500 is used twice in the overall process described in method 300, once for the initial authentication when a user attempts to start a session and again when the user approves the session signing. This double authentication ensures a high level of security, verifying the user's identity both at the start of a session and at the critical point of session authorization.

By using this robust, biometric-based authentication process, the system can provide strong security and user verification across a wide range of application scenarios, from logging into a traditional computer to authorizing an AI Agent or Robot Twin to act on the user's behalf.

Although implementations for the system 101 and the method 300 for managing operating system using tokenized identity, have been described in language specific to structural features and methods, it must be understood that the claims are not limited to the specific features or methods described. Rather, the specific features and methods are disclosed as examples of implementations for the system 101 and the method 300 for Identity Management.

The invention claimed is:

1. A System for managing an Operating System using tokenized identity, the system comprising:

a processor and a memory coupled to the processor, wherein the processor is configured to execute instructions stored in the memory for:

a) maintaining a token repository, wherein the token repository is configured to maintain a user token, a Unique-Number, and a Public-Key corresponding to each user from a set of users;

b) registering a user by, receiving a set of biometric samples of the user corresponding to one or more biometric factors, processing the set of biometric samples to compute a Secret-Key (S1) corresponding to the user, generating a Unique-Number (N1) using a random number generation algorithm, applying a Function (F1) to the Secret-Key (S1) and the Unique-Number (N1) to compute a Public-Key (P1), storing the Unique-Number (N1) on a provisioned virtual remote device and in a token repository, wherein the provisioned virtual remote device is a virtual machine corresponding to the user, wherein the provisioned virtual remote device is hosted over a remote server, wherein the token repository is hosted over a centralized server and storing the Public-Key (P1) in the token repository, on the provisioned virtual remote device, and on a thin client application on a personal local device, receiving a user input on the thin client application corresponding to one or more immutable attributes of the user, generating an immutable attribute token for each immutable attribute, and storing the immutable attribute tokens along with the Public-Key (P1) in the token repository;

c) transmitting to a user, a session signing request from a proxy-user management application, wherein the proxy-user management application is integrated with a device Operating System (OS), wherein the session signing request corresponds to a user-authenticated session, on the device Operating System (OS), wherein the session signing request is received via a thin client session running on a client device;

d) initiating a first authentication process for authenticating the user via the thin client session by, receiving a biometric sample captured from the user in real-time, processing the biometric sample to generate a Secret-Key (S2), when using a thin client application on a personal local device, selecting the Public-Key (P1) from the thin client application, fetching the corresponding Public-Key (P1) from the token repository, computing a Real-Time-Unique-Number (N2) using the Public-Key (P1), the Secret-Key (S2) and the Function (F1), and authenticating the user based on comparison of the Real-Time-Unique-Number (N2) with the Unique-Number (N1) stored in the token repository, when using a thin client application on a non-personal local device, receiving a user input corresponding to the one or more immutable attributes of the user, generating a token corresponding to each of the one or more immutable attributes, querying the token repository for one or more tokens, fetching the public-keys (P1-Pn) corresponding to the one or more tokens, computing a Real-Time-Unique-Number (N2) for each Public-Key (P1-Pn), the Secret-Key (S2) and the Function (F1), identifying a target Real-Time-Unique-Number (N2 $t$), wherein the target Real-Time-Unique-Number (N2 $t$) matches the Unique-Number (N1) stored in the token repository, and authenticating the user based on comparison of the target Real-Time-Unique-Numbers (N2 $t$) with the Unique-Number (N1) stored in the token repository;

e) fetching from the token repository, a user token (T1) corresponding to the Unique-Number (N1);

f) Identifying from a set of proxy-user management application instances, a proxy-user management application instance corresponding to the user token (T1);

g) displaying a request to sign the proxy-user management application session and the corresponding device OS session;

h) capturing the user's approval to affix the user's biometrically authenticated signature to the session;

i) initiating a second authentication process; and j) recording the user's biometrically authenticated signature in the proxy-user management application session log.

2. The system of claim 1, wherein the proxy-user management application is a device operating system, wherein the device operating system corresponds to a computer OS, an Artificial Intelligence (AI) Agent OS, or a Robot OS, wherein the user is logged into computer, wherein the user's biometrically authenticated signature in the proxy-user management application session log corresponds to the user's authorization for the computer operation session, wherein the AI Agent represents the user when interacting with others, wherein the user's biometrically authenticated signature in the proxy-user management application session log corresponds to the user's authorization for the AI Agent operation session, and wherein the Robot represents the user, when interacting with others, wherein the user's biometrically authenticated signature in the proxy-user management application session log corresponds to the user's authorization for the Robot operation session.

3. The system of claim 1, wherein the session signing request is triggered by the proxy-user management application session based on a set of predefined rules.

4. The system of claim 1, wherein the session signing request is generated upon receiving a user command to launch the proxy-user management application session.

5. The system of claim 4, wherein the proxy-user management application session is configured to record the user's biometrically authenticated signature, wherein the user's biometrically authenticated signature represents a promise to abide by the terms and conditions specified in respect of the proxy-user management application session.

6. The system of claim 1, wherein the second authentication process is triggered upon capturing the user's approval through the user interface, wherein the second authentication process is the same as the first authentication process.

7. The system of claim 1, wherein when the user is accessing the system via a thin client on the user's personal device, fetching the Public-Key (P1) corresponding to the user from the token repository.

8. A method for managing an Operating System using tokenized identity, the method comprising steps of:

a) maintaining a token repository, wherein the token repository is configured to maintain a user token, a Unique-Number, and a Public-Key corresponding to each user from a set of users;

b) registering a user by, receiving a set of biometric samples of the user corresponding to one or more biometric factors, processing the set of biometric samples to compute a Secret-Key (S1) corresponding to the user, generating a Unique-Number (N1) using a random number generation algorithm, applying a Function (F1) to the Secret-Key (S1) and the Unique-Number (N1) to compute a Public-Key (P1), storing the Unique-Number (N1) on a provisioned virtual remote device and in a token repository, wherein the provisioned virtual remote device is a virtual machine corresponding to the user, wherein the provisioned virtual remote device is hosted over a remote server, wherein the token repository is hosted over a centralized server and storing the Public-Key (P1) in the token repository, on the provisioned virtual remote device, and on a thin client application on a personal local device, receiving a user input on the thin client application corresponding to one or more immutable attributes of the user, generating an immutable attribute token for each immutable attribute, and storing the immutable attribute tokens along with the Public-Key (P1) in the token repository;

c) transmitting to a user, a session signing request from a proxy-user management application, wherein the proxy-user management application is integrated with a device Operating System (OS), wherein the session signing request corresponds to a user-authenticated session, on the device Operating System (OS), wherein the session signing request is received via a thin client session running on a client device;

d) initiating a first authentication process for authenticating the user via the thin client session by, receiving a biometric sample captured from the user in real-time, processing the biometric sample to generate a Secret-Key (S2), when using a thin client application on a personal local device, selecting the Public-Key (P1) from the thin client application, fetching the corresponding Public-Key (P1) from the token repository, computing a Real-Time-Unique-Number (N2) using the Public-Key (P1), the Secret-Key (S2) and the Function (F1), and authenticating the user based on comparison of the Real-Time-Unique-Number (N2) with the Unique-Number (N1) stored in the token repository, when using a thin client application on a non-personal local device, receiving a user input corresponding to the one or more immutable attributes of the user, generating a token corresponding to each of the one or more immutable attributes, querying the token repository for one or more tokens;

fetching the public-keys (P1-Pn) corresponding to the one or more tokens, computing a Real-Time-Unique-Number (N2) for each Public-Key (P1-Pn), the Secret-Key (S2) and the Function (F1), identifying a target Real-Time-Unique-Number (N2 $t$), wherein the target Real-Time-Unique-Number (N2 $t$) matches the Unique-Number (N1) stored in the token repository, and authenticating the user based on comparison of the target Real-Time-Unique-Numbers (N2 $t$) with the Unique-Number (N1) stored in the token repository;

e) fetching from the token repository, a user token (T1) corresponding to the Unique-Number (N1);

f) identifying from a set of proxy-user management application instances, a proxy-user management application instance corresponding to the user token (T1);

g) displaying a request to sign the proxy-user management application session and the corresponding device OS session;

h) capturing the user's approval to affix the user's biometrically authenticated signature to the session;

i) initiating a second authentication process; and j) recording the user's biometrically authenticated signature in the proxy-user management application session log.

9. The method of claim 8, wherein the proxy-user management application is a device operating system, wherein the device operating system corresponds to a computer OS, an Artificial Intelligence (AI) Agent OS, or a Robot OS, wherein the user is logged into a computer, wherein the user's biometrically authenticated signature in the proxy-user management application session log corresponds to the user's authorization for the computer operation session, wherein the AI Agent represents the user when interacting with others, wherein the user's biometrically authenticated signature in the proxy-user management application session log corresponds to the user's authorization for the AI Agent operation session, wherein the Robot represents the user, when interacting with others, wherein the user's biometrically authenticated signature in the proxy-user management application session log corresponds to the user's authorization for the Robot operation session.

10. The method of claim 8, wherein the session signing request is triggered by the proxy-user management application session based on a set of predefined rules.

11. The method of claim 10, wherein the proxy-user management application session is configured to record the user's biometrically authenticated signature, wherein the user's biometrically authenticated signature represents an agreement to abide by the terms and conditions specified in respect of the proxy-user management application session.

12. The method of claim 8, wherein the session signing request is generated upon receiving a user command to launch the proxy-user management application session.

13. The method of claim 8, wherein the second authentication process is triggered upon capturing the user's approval through the user interface, wherein the second authentication process is the same as the first authentication process.

14. A non-transitory computer-readable storage medium storing a computer program product comprising computer-executable instructions for managing an Operating System using tokenized identity, which when executed by one or more processors, cause the one or more processors to:

a) maintain a token repository, wherein the token repository is configured to maintain a user token, a Unique-Number, and a Public-Key corresponding to each user from a set of users;

b) registering a user by, receiving a set of biometric samples of the user corresponding to one or more biometric factors, processing the set of biometric samples to compute a Secret-Key (S1) corresponding to the user, generating a Unique-Number (N1) using a random number generation algorithm, applying a Function (F1) to the Secret-Key (S1) and the Unique-Number (N1) to compute a Public-Key (P1), storing the Unique-Number (N1) on a provisioned virtual remote device and in a token repository, wherein the provisioned virtual remote device is a virtual machine corresponding to the user, wherein the provisioned virtual remote device is hosted over a remote server, wherein the token repository is hosted over a centralized server, and storing the Public-Key (P1) in the token repository, on the provisioned virtual remote device, and on a thin client application on a personal local device, receiving a user input on the thin client application corresponding to one or more immutable attributes of the user, generating an immutable attribute token for each immutable attribute, and storing the immutable attribute tokens along with the Public-Key (P1) in the token repository;

c) transmitting to a user, a session signing request from a proxy-user management application, wherein the proxy-user management application is integrated with a device Operating System (OS), wherein the session signing request corresponds to a user-authenticated session, on the device Operating System (OS), wherein the session signing request is received via a thin client session running on a client device;

d) initiating a first authentication process for authenticating the user via the thin client session by, receiving a biometric sample captured from the user in real-time, processing the biometric sample to generate a Secret-Key (S2), when using a thin client application on a personal local device, selecting the Public-Key (P1) from the thin client application;

fetching the corresponding Public-Key (P1) from the token repository, computing a Real-Time-Unique-Number (N2) using the Public-Key (P1), the Secret-Key (S2) and the Function (F1), and authenticating the user based on comparison of the Real-Time-Unique-Number (N2) with the Unique-Number (N1) stored in the token repository, when using a thin client application on a non-personal local device, receiving a user input corresponding to the one or more immutable attributes of the user, generating a token corresponding to each of the one or more immutable attributes, querying the token repository for one or more tokens, fetching the public-keys (P1-Pn) corresponding to the one or more tokens, computing a Real-Time-Unique-Number (N2) for each Public-Key (P1-Pn), the Secret-Key (S2) and the Function (F1), identifying a target Real-Time-Unique-Number (N2 *t*), wherein the target Real-Time-Unique-Number (N2 *t*) matches the Unique-Number (N1) stored in the token repository, and authenticating the user based on comparison of the target Real-Time-Unique-Numbers (N2 *t*) with the Unique-Number (N1) stored in the token repository, e) fetching from the token repository, a user token (T1) corresponding to the Unique-Number (N1);

f) identifying from a set of proxy-user management application instances, a proxy-user management application instance corresponding to the user token (T1);

g) displaying a request to sign the proxy-user management application session and the corresponding device OS session;

h) capturing the user's approval to affix the user's biometrically authenticated signature to the session;

i) initiating a second authentication process; and j) recording the user's biometrically authenticated signature in the proxy-user management application session log.

\* \* \* \* \*